July 10, 1928.
E. E. MacGUIRE
1,676,453
TRACTION LUG FOR VEHICLES
Filed June 18, 1927   2 Sheets-Sheet 1
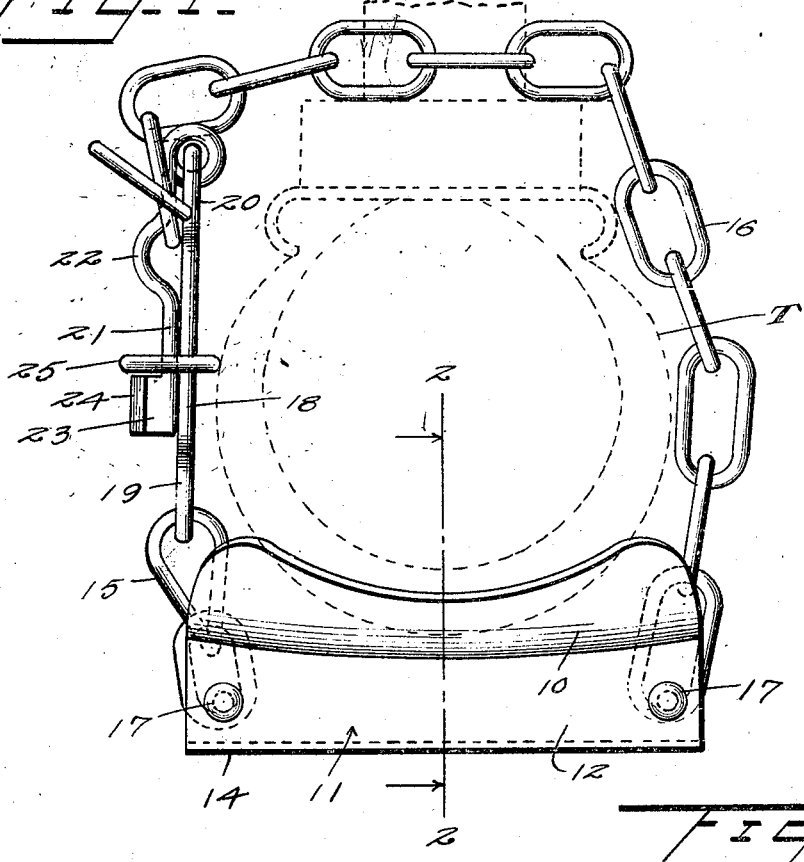
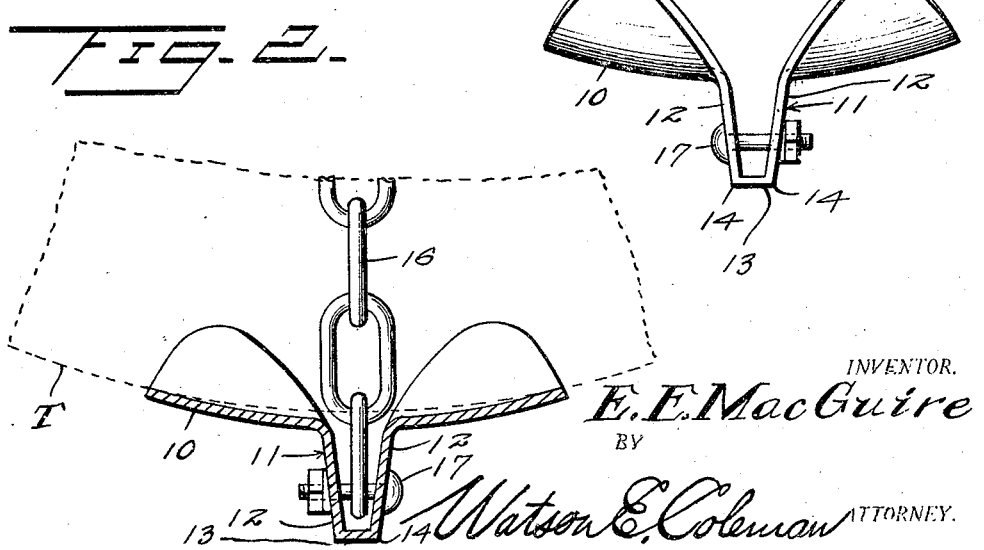
INVENTOR.
E. F. MacGuire
BY
Watson E. Coleman ATTORNEY.

July 10, 1928.                                                                                1,676,453
E. E. MacGUIRE
TRACTION LUG FOR VEHICLES
Filed June 18, 1927                    2 Sheets-Sheet 2
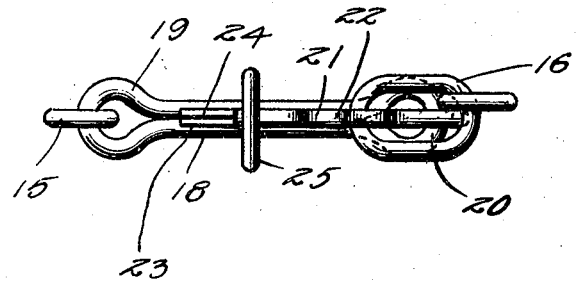
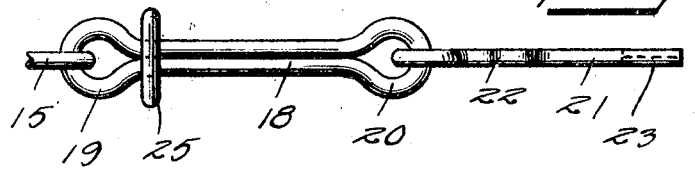
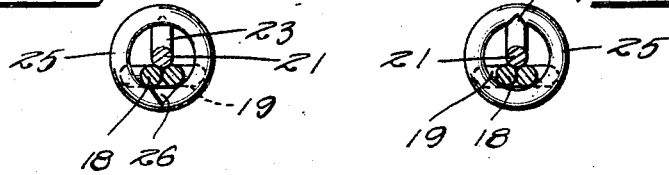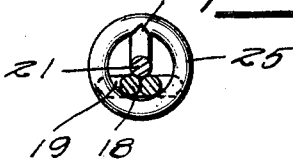
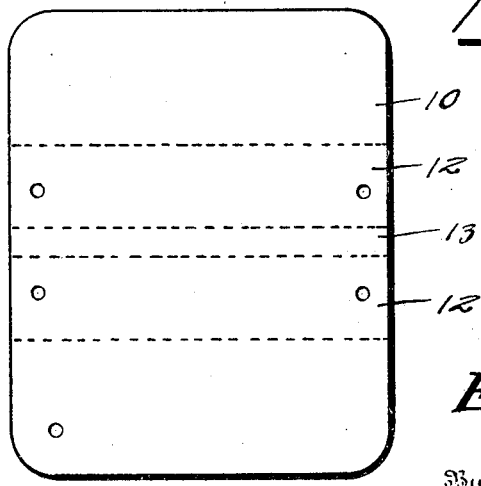
Inventor
E. E. MacGuire
By Watson E. Coleman
Attorney Patented July 10, 1928.

1,676,453

UNITED STATES PATENT OFFICE.

ELMER E. MacGUIRE, OF ANACONDA, MONTANA.

TRACTION LUG FOR VEHICLES.

Application filed June 18, 1927. Serial No. 199,764.

This invention relates to a traction lug for vehicles and more particularly to a device of this character which is equally effective for use in mud, snow or sand.

An important object of the invention is to provide a lug of such construction that it will not damage the tire when in use and which provides a traction surface engaging the ground, insuring a firm grip upon the road-bed.

A further object of the invention is to provide a device of this character which may be readily and cheaply constructed, which will be durable and efficient in service and a general improvement in the art.

A further object of the invention is the provision of a novel and efficient means for attaching flexible elements to the lug to secure the same to the vehicle wheel and provide a novel and efficient connecting means between the flexible elements.

These and other objects I attain by the construction shown in the accompanying drawings, wherein for the purpose of illustration is shown a preferred embodiment of my invention and wherein:—

Figure 1 is a side elevation of a mud lug constructed in accordance with my invention and the connector employed therewith, the device being shown as applied to a tire which is illustrated in dotted lines Figure 2 is a section on the line 2—2 of Figure 1;

Figure 3 is an end elevation of the mud lug;

Figure 4 is a plan of the fastener employed, the same being shown in the closed position;

Figure 5 is a similar view showing the fastener in the open position;

Figure 6 is a transverse sectional view through the fastener when latched;

Figure 7 is a similar view with the ring rotated so that it may move to the fastener releasing position;

Figure 8 is a plan of the blank employed in the construction of a mud lug.

Referring now more particularly to the drawings, the numeral 10 generally designates a structure curved upon its inner face both longitudinally and transversely to conform to the curvature of a vehicle tire T to which it is applied. The outer face of this structure is provided at its center with a transversely extending rib 11, the sides 12 of which converge toward one another toward the outer edge of the rib. The outer edge 13 of the rib joins the side faces 12 thereof at relatively sharp corners 14, which will cut into and firmly engage against the surface over which the vehicle is travelling to provide the necessary traction. The ends of the rib afford recesses into which are extended the ends of chains 15 and 16. Bolts or rivets 17 traverse these recesses and extend through the end links of the chain to secure them in position within the recesses. In the preferred construction of the lug just described, a flat plate is folded centrally to produce the rib 11. The ends of this plate are then pressed to provide the proper curvature, so that they will fit the surface of the tire.

The end of the chain 15 has attached thereto a connector in the form of a body 18 having at its opposite ends eyes 19 and 20. The eye 19 engages the end link of the chain and the eye 20 has pivoted thereto an arm 21, which may be swung to a position where it overlies the body 18. This arm is bent intermediate its ends to provide a cove 22 which, when the arm is in said position, provides a space between the body 18 and the arm, for the reception of a chain link. The free end of the arm has a head 23 projecting to that side of the arm remote from the body 18 when the arm is in said position and the free side edge of the head is sharpened, as at 24.

Surrounding the body 18 is a keeper ring 25 having an internal diameter less than the combined thickness of the body 18 and the arm 21 at the head 23. The inner wall of this ring has formed therein a notch 26 alignable with the head 23 and which, when aligned with the head, permits the ring to be slipped over the head, until it encircles both the arm inwardly of the head and the body 18. It will be obvious that the end link 27 of the chain 16 may be slipped over the arm 21, the arm folded into position against the body 18 and the ring 25 engaged over the arm, as above described, with the result that the chains 15 and 16 will be securely connected. In referring to the end link of the chain 16, it will, of course, be understood that I am referring to the effective end link which need not necessarily be the actual end link of the chain, but is the end link of that portion of the chain 16 which is necessary to provide in combination with the connector and chain 15, the proper length to encircle the vehicle tire and the felly upon which it is mounted.

Since the construction hereinbefore set forth is capable of a certain range of change and modification without materially departing from the spirit of the invention, I do not limit myself to such specific structure except as hereinafter claimed.

I claim:

1. A chain connector comprising a body having an eye at one end for engagement with the end link of one of a pair of chain ends to be connected, an arm pivoted to the opposite end of the body and swingable about the pivot thereof to a position where it lies against the body, said arm being offset intermediate its ends whereby in the last named position it provides a cove for the reception of an end link of the second chain, means for securing said arm in said position comprising a ring surrounding and rotatable upon the body and a head on said arm, said ring in one position thereof being bodily movable longitudinally of the body over the head to overlie the arm and prevent separation thereof from the member.

2. A chain connector comprising a body having an eye at one end for engagement with the end link of one of a pair of chain ends to be connected, an arm pivoted to the opposite end of the body and swingable about the pivot thereof to a position where it lies against the body, said arm being offset intermediate its ends whereby in the last named position it provides a cove for the reception of an end link of the second chain, means for securing said arm in said position comprising a ring surrounding and rotatable upon the body and a head on said arm, said ring in one position thereof being bodily movable longitudinally of the body, over the head to overlie the arm and prevent separation thereof from the member, the pivotal connection between the arm and body preventing escape of said ring from the end of the body to which the arm is attached.

3. A chain connector comprising a body having an eye at one end for engagement with the end link of one of a pair of chain ends to be connected, an arm pivoted to the opposite end of the body and swingable about the pivot thereof to a position where it lies against the body, said arm being offset intermediate its ends whereby in the last named position it provides a cove for the reception of an end link of the second chain, a ring surrounding the body and rotatable thereupon, said ring having a notch, the arm having a head over which, when the arm is in engagement with the body, and the ring is rotatably adjusted to align the notch with the head, the ring may pass to overlie the arm and prevent separation of the arm from the body.

In testimony whereof I hereunto affix my signature.

ELMER E. MacGUIRE.